United States Patent
Conde

(10) Patent No.: US 9,210,912 B1
(45) Date of Patent: Dec. 15, 2015

(54) PET TOY WITH HIDDEN TREAT CAVITY

(71) Applicant: Michael A. Conde, Shepherdsville, KY (US)

(72) Inventor: Michael A. Conde, Shepherdsville, KY (US)

(*) Notice: Subject to any disclaimer, the term of this patent is extended or adjusted under 35 U.S.C. 154(b) by 19 days.

(21) Appl. No.: 14/214,484

(22) Filed: Mar. 14, 2014

Related U.S. Application Data

(60) Provisional application No. 61/800,602, filed on Mar. 15, 2013.

(51) Int. Cl.
*A01K 15/02* (2006.01)
*A01K 11/00* (2006.01)
*A01K 5/01* (2006.01)

(52) U.S. Cl.
CPC ............. *A01K 15/026* (2013.01); *A01K 5/0114* (2013.01)

(58) Field of Classification Search
CPC .. A01K 15/025; A01K 15/026; A01K 5/0114
USPC ................. 119/709, 707, 710, 708, 711, 702; 446/102
See application file for complete search history.

(56) References Cited

U.S. PATENT DOCUMENTS

| | | | |
|---|---|---|---|
| 5,813,366 A | 9/1998 | Mauldin, Jr. | |
| 5,832,877 A | 11/1998 | Markham | |
| 5,947,061 A | 9/1999 | Markham et al. | |
| 5,965,182 A | 10/1999 | Lindgren | |
| 6,073,581 A * | 6/2000 | Wang .......................... | 119/51.01 |
| 7,246,574 B2 * | 7/2007 | Renforth ....................... | 119/711 |
| 7,270,085 B2 * | 9/2007 | Wolfe et al. ................... | 119/709 |
| 7,367,283 B2 * | 5/2008 | Aboujaoude et al. ......... | 119/707 |
| 7,536,978 B2 | 5/2009 | Washington et al. | |
| 7,600,488 B2 | 10/2009 | Mann | |
| 8,141,521 B2 | 3/2012 | Shatoff et al. | |
| 8,453,609 B2 | 6/2013 | McCann | |
| 8,474,404 B2 * | 7/2013 | Costello ..................... | 119/51.01 |
| 8,516,977 B2 | 8/2013 | Shatoff et al. | |
| 8,584,620 B2 | 11/2013 | Rutherford et al. | |
| 8,701,599 B2 * | 4/2014 | Dewey et al. ................. | 119/710 |
| 8,746,182 B2 * | 6/2014 | Anderson ..................... | 119/710 |
| 8,820,268 B2 * | 9/2014 | Valle et al. .................... | 119/710 |
| 8,899,187 B2 * | 12/2014 | Axelrod et al. ............... | 119/707 |
| 8,904,967 B2 * | 12/2014 | Reiss et al. .................... | 119/710 |
| 2007/0044730 A1 * | 3/2007 | Axelrod et al. ............... | 119/709 |
| 2012/0137986 A1 | 6/2012 | Shatoff et al. | |
| 2012/0152180 A1 | 6/2012 | McCann | |
| 2013/0019812 A1 | 1/2013 | Rutherford et al. | |

* cited by examiner

*Primary Examiner* — Yvonne Abbott-Lewis
(74) *Attorney, Agent, or Firm* — Law Office of J. L. Simunic; Joan L. Simunic

(57) ABSTRACT

The present development is a toy for a pet having a housing and at least one rotatable member, wherein the toy has at least one hidden cavity for accommodating a treat. The rotatable member enhances the degree of difficulty for the pet to gain access to the cavity.

10 Claims, 4 Drawing Sheets

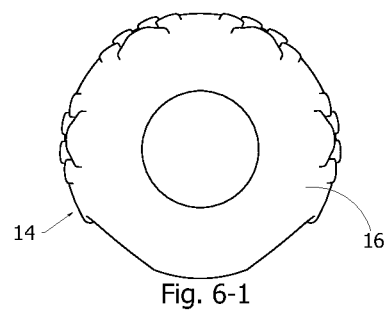
Fig. 6-1
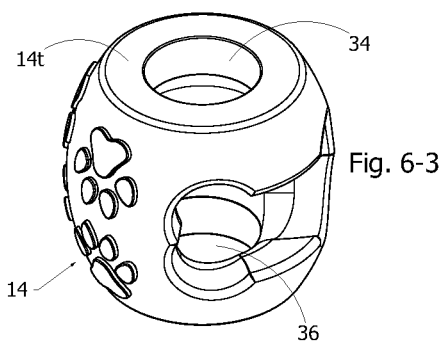
Fig. 6-3
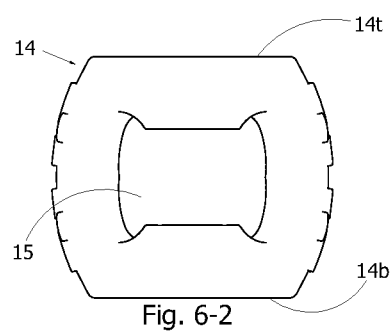
Fig. 6-2
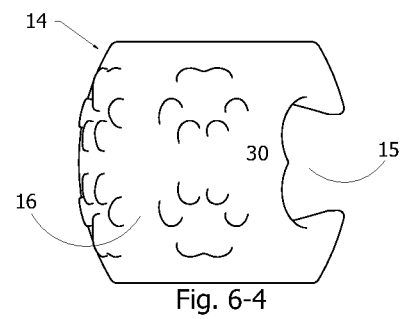
Fig. 6-4
Figure 6

PET TOY WITH HIDDEN TREAT CAVITY

CROSS-REFERENCE TO PRIOR APPLICATIONS

The present application claims priority to U.S. Patent Application 61/800,602 filed 15 Mar. 2013, which is incorporated by reference in its entirety.

BACKGROUND

The present development is a toy for a pet comprising a housing and at least one rotatable member, wherein the toy has at least one hidden cavity for accommodating a treat. The toy preferably includes a means for enhancing the degree of difficulty in gaining access to the cavity.

Household pets enjoy playing with toys. Most toys are designed to allow the pet to chew on the toy, or to provide entertainment while batting the toy around.

As pets spend more time confined in relatively small spaces, such as within houses or residential yards, their need for intellectual stimulation increases. However, few toys are designed to be intellectually challenging for the pet.

The present development addresses this issue by providing a pet toy design that challenges the pet to determine how to access a treat hidden within the toy housing.

SUMMARY OF THE PRESENT INVENTION

The present development is a toy for a pet comprising an elongated housing with at least one rotatable member comprising at least one cavity for accommodating a treat for a pet. The rotatable member is mounted within the housing such that the cavity can be exposed, filled with a treat, and then rotated so the cavity and treat are no longer visible.

BRIEF DESCRIPTION OF THE DRAWINGS

FIG. 3-1 shows a front view of a housing section of the toy of FIG. 2;

FIG. 3-2 shows a back view of the housing section of FIG. 3-1;

FIG. 3-3 shows an interior view of the housing section of FIG. 3-1;

FIG. 3-4 shows a top view of the housing section of FIG. 3-1;

FIG. 3-5 shows a side view of the housing section of FIG. 3-1;

FIG. 4 is an exterior perspective view of the housing of the toy of FIG. 1;

FIG. 5 is an interior perspective view of the housing of the toy of FIG. 1;

FIG. 6-1 is a top view of the rotatable member of the toy of FIG. 1;

FIG. 6-2 is a top perspective view of the rotatable member of FIG. 6-1;

FIG. 6-3 is a front view of the rotatable member of FIG. 6-1;

FIG. 6-4 is a side view of the rotatable member of FIG. 6-1.

DETAILED DESCRIPTION OF THE PRESENT DEVELOPMENT

Figure 1A:
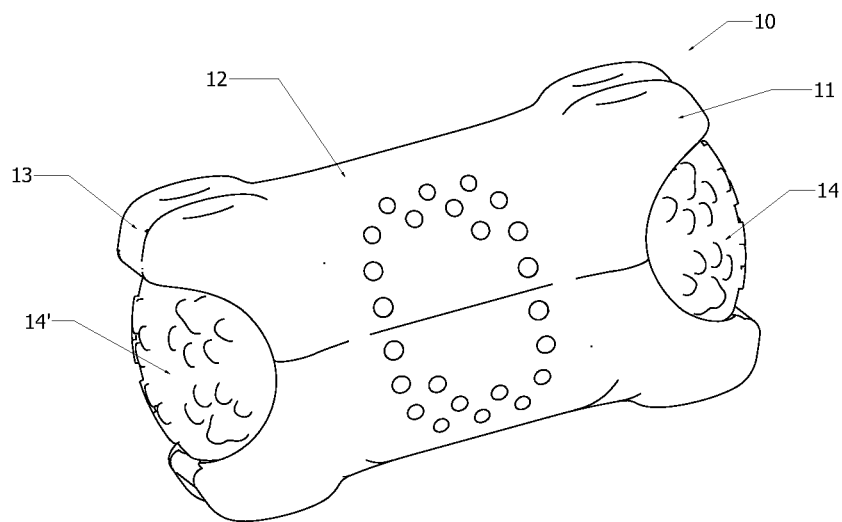
FIG. 1A is a perspective view of a fully-assembled toy with the rotatable members turned to hide the aperture to the cavity.

The following description is intended to provide the reader with a better understanding of the invention. The description is not intended to be limiting with respect to any element not otherwise limited within the claims.

As shown in FIGS. 1-6, the present development is a toy 10 comprising an elongated housing 12 having a first end 11 and a second end 13 with a first rotatable member 14 mounted at the first end 11 and, optionally, a second rotatable member 14' mounted at the second end 13. At least one of the rotatable members 14, 14' comprises at least one cavity 15, 15' for accommodating a treat for a pet. The rotatable members are mounted within the housing such that the cavity can be exposed, filled with a treat, and then rotated so the cavity and treat are no longer visible.

Figure 1B:
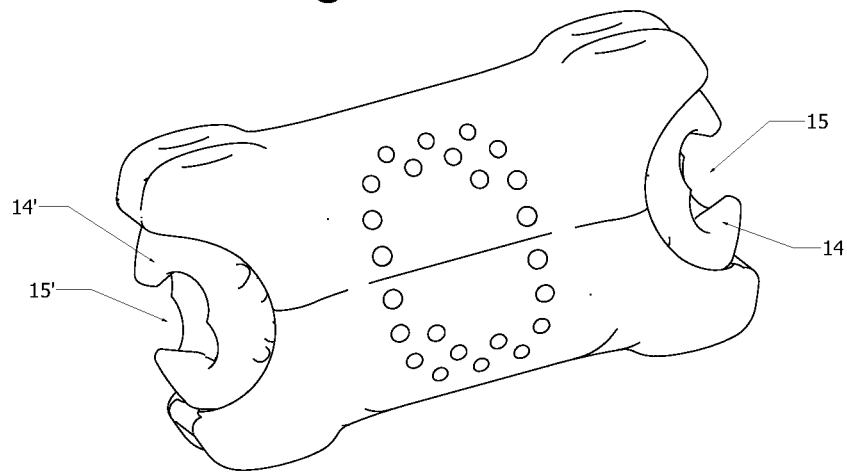
FIG. 1B is a perspective view of a fully-assembled toy with the rotatable members turned to hide the aperture to the cavity.

As shown in FIG. 1B, when in use, the member 14' having the cavity 15' is rotated enough to expose the cavity 15'. Once the treat has been inserted into the cavity 15' of the member 14' the member 14' is then rotated so the cavity 15' is no longer accessible from the exterior of the toy 10, and the toy 10 is given to the pet. As the pet plays with the toy 10 it senses the presence of the hidden treat and exerts itself in trying to reach the treat, eventually figuring out how to move the rotating member enough to expose the cavity 15' and gain access to the treat. The treat preferably is a type of food, such as a dog biscuit, or peanut butter, or some other product that would attract the pet's interest.

Figure 2:
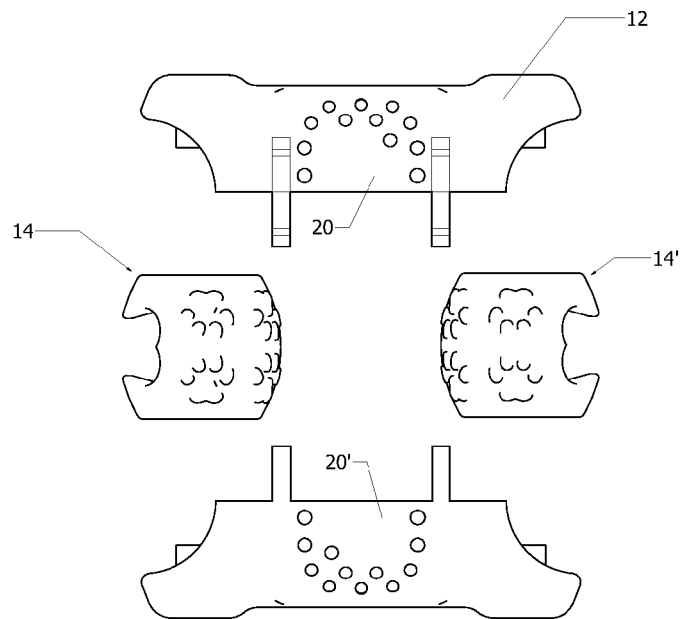
FIG. 2 is an exploded view of the toy of FIG. 1.
Figure 3:
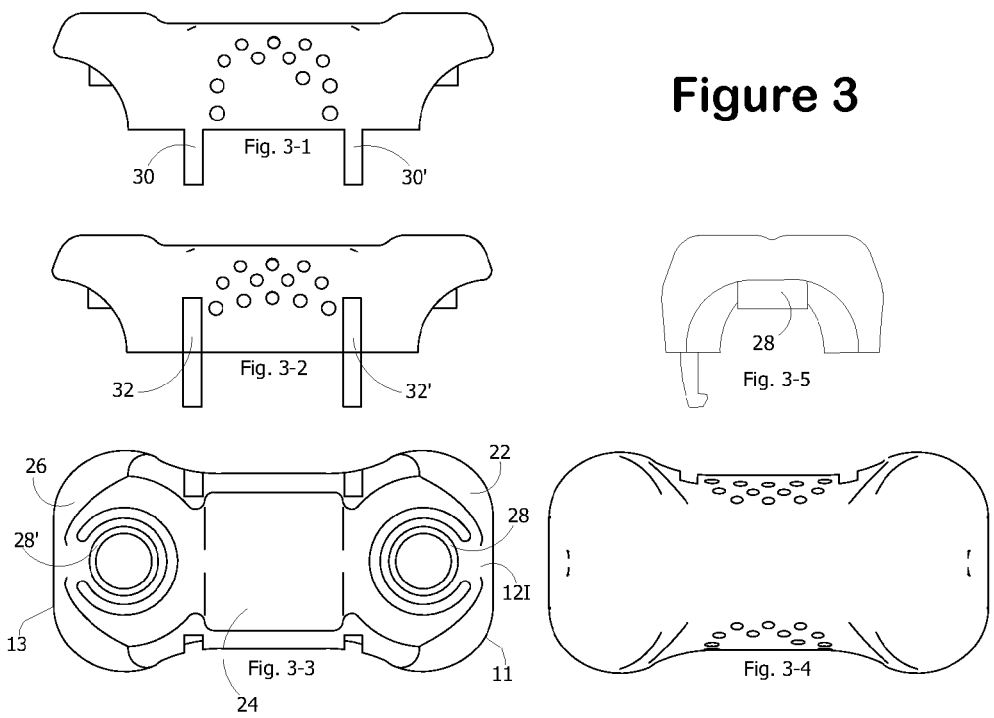

As shown in FIG. 2, in a first embodiment, the toy 10 comprises a housing 12 that has two essentially identical sections 20, 20' and two essentially identical rotatable members 14, 14'. As shown in FIGS. 3-1 to 3-5, the housing section 20 is designed to have three regions 22, 24, 26. The first region 22 is located at the first end of the housing 11, the third region 26 is located at the second end of the housing 13, the second region 24 is located between the first region 22 and the third region 26.

The first region 22 is contoured to accommodate the rotatable member 14 in such a manner that the cavity 15 can be exposed when the rotatable member 14 is properly mounted in the first region 22. In a preferred embodiment, the first section includes a stub axle 28 on an interior face 121 that can engage the rotatable member 14 to allow the member 14 to rotate while being retained within the housing 20. The third region 26 is a mirror image of the first region 22. The second region 24 is provided to elongate the housing 12, and may vary in length to accommodate different sized animals. The second region 24 may be hollow or solid.

Figure 4:
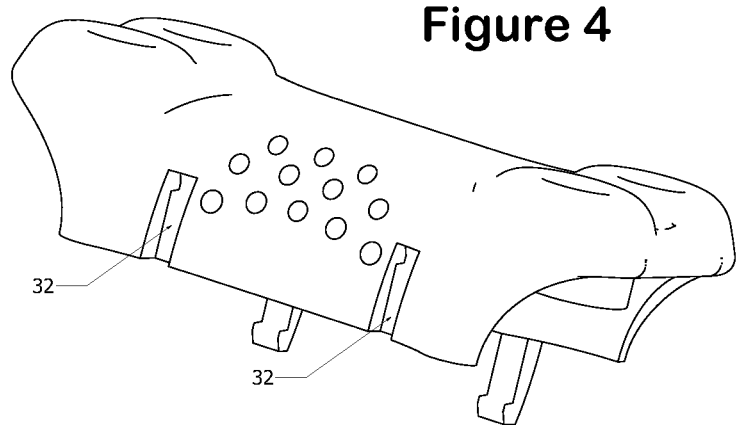
Figure 5:
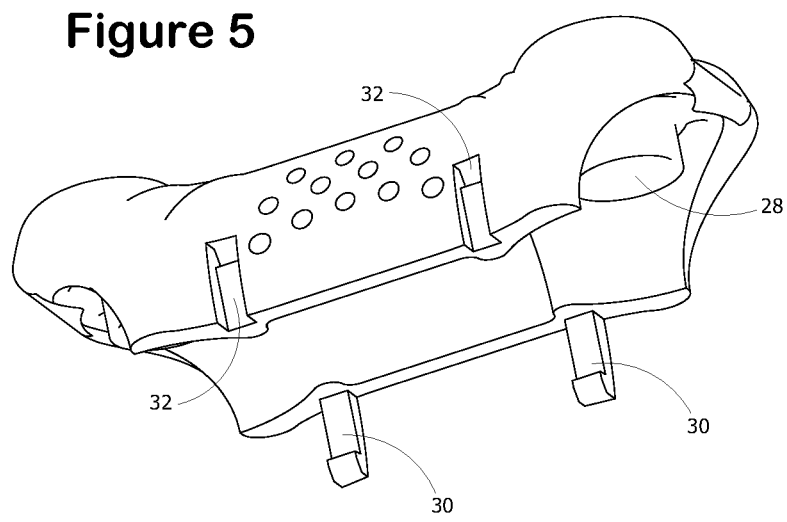

As shown in FIGS. 4 and 5, the housing section 20, 20' further includes at least one snap latch projection 30 with a complementary snap latch receiving slot 32 on the opposing side. If properly oriented, two pieces of the housing 20, 20' can be reversibly joined by aligning the snap latch projection 30 on one housing piece 20 with the snap latch receiving slot 32 on the second housing piece 20'.

Referring to FIGS. 6-1 through 6-4, the rotatable member 14 defines a top 14t, a bottom 14b, and a body section 16. At least one rotatable member 14 must include at least one cavity 15 in the body section 16 through which the pet can retrieve the treat. The rotatable member 14 must also include some means by which the rotatable member 14 can be retained within the housing 12 while still being able to rotate. In a preferred embodiment, the rotatable member 14 comprises a top cavity 34 and a bottom cavity 36 each large enough to allow the stub axle 28 to project through the respective cavity 34, 36.

An exemplary embodiment comprises two housing sections 20, 20' each having two stub axles 28, 28', two snap latch projections 30, 30', and two snap latch receiving slots 32, 32'; and two rotatable members 14, 14' each having a top cavity 34, 34' (not shown), a bottom cavity 36, 36' (not shown), and a treat cavity 15, 15'. To assemble the toy 10, one rotatable member 14 is placed on the first stub axle 28 of the first housing section 20 so the first stub axle 28 projects through the bottom cavity 36 and the second rotatable member 14' is placed on the second stub axle 28' of the first housing section 20 so the second stub axle 28' projects through the bottom cavity 36'. The second housing section 20' is then positioned such that the first stub axle 28' projects through the top cavity 34 of the first rotatable member 14 and the second stub axle 28' projects through the top cavity 34' of the second rotatable member 14'. In this orientation, the snap latch projections 30, 30' of the first housing section 20 can engage with the snap latch receiving slots 32, 32' of the second housing section 20' and vice versa so the housing sections can form a single unitary housing retaining the rotatable members 14, 14' in position.

In a second embodiment, the second region 24 of the housing is hollow and the cavity 15 of the rotatable member 14 can align with the hollowed portion of the housing so the treat can fall into the housing. To retrieve the treat, the treat must move back into the cavity of the rotatable member, and the rotatable member must be turned so the cavity is exposed.

In a third embodiment, one rotatable member comprises a cavity to accommodate pet treats while a second rotatable member has a body without a cavity. To retrieve the treat, the pet must identify which rotatable member has the cavity.

In a fourth embodiment, the housing comprises a solid section in the second region 24 of the housing so the treat is retained within the rotatable member.

In a fifth embodiment, the rotatable member has a top depression and a bottom depression in place of the top cavity and bottom cavity, wherein the depressions are deep enough to retain the rotatable member on the axle stubs.

In a sixth embodiment, the first section of the housing is contoured to accommodate a rotatable member and the third section is contoured to form a closed structure when at least two housing sections are combined.

In a seventh embodiment, the housing comprises more than two sections, which when joined, retain at least one rotatable member.

In an eighth embodiment, the housing further comprises an aperture (not shown) that leads into the second housing region 24 and that can further be sealed closed with a cap or plug or any other means known in the art to temporarily seal an opening. This aperture may be used to insert the treat directly into the center section of the housing where it can then be available to the rotatable member.

Preferably, the present development is made from a material such as plastic resin, or rubber, or synthetic material. The material may include various colors and textures as known in the art for pet toys.

Optionally, the toy of the present development may include indentations to allow for the pet to grip the toy in its teeth. A further optional feature is the inclusion of grooves or ridges on the exterior surface of the housing that will allow the pet to stabilize the toy with its paws. Another optional feature is the inclusion of bumps on the rotatable members to allow the pet to facilitate rotation of the rotatable member with its paws.

Unless defined otherwise, all technical and scientific terms used herein have the same meaning as commonly understood by one of ordinary skill in the art to which the presently disclosed subject matter pertains. Representative methods, devices, and materials are described herein, but are not intended to be limiting unless so noted.

The terms "a", "an", and "the" refer to "one or more" when used in the subject specification, including the claims. Thus, for example, reference to "a section" includes a plurality of such sections, and so forth.

Unless otherwise indicated, all numbers expressing quantities of components, conditions, and otherwise used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter As used herein, the term "about", when referring to a value or to an amount of mass, weight, time, volume, concentration, or percentage can encompass variations of such value or amount, as such variations are appropriate in the disclosed application.

It is anticipated that the pet toy described herein may be used for other purposes. For example, the toy is not limited to use with household pets but may be placed outdoors to stymie curious wildlife, such as squirrels or raccoons.

Specific dimensions relevant to the pet toy described herein are provided for the purpose of demonstrating the invention, but these dimensions are not intended to limit the scope of the invention. It is understood that one skilled in the art may make alterations to the embodiments shown and described herein without departing from the scope of the invention.

What is claimed is:

1. A toy for a pet comprising:
    a) a first housing section having a first region, a second region and a third region, wherein the second region is positioned between and separates the first region from the third region, and said first housing section defining an interior surface, and having a first axle stub projecting from the interior surface in the first region and a second axle stub projecting from the interior surface in the third region, and said housing section having a means to engage a second essentially identical housing section to form a single housing unit;
    b) a second housing section essentially identical to said first housing section, said second housing section having a means to engage said first housing section to form a single housing unit;
    c) a first rotatable member defining a top, a bottom, and a body section, wherein said body section includes a cavity of sufficient size to accommodate a pet treat, and wherein said bottom includes a means for said rotatable member to engage the first axle stub of said first housing section and said top includes a means for said rotatable member to engage the second axle stub of said second housing section; and,
    d) a second rotatable member defining a top, a bottom, and a body section, wherein said bottom includes a means for said rotatable member to engage the second axle stub of said first housing section and said top includes a means for said rotatable member to engage the first axle stub of said second housing section;
    and wherein said first region on said first housing section and said third region on said second housing section are contoured to accommodate said first rotatable member in such a manner that the cavity can be exposed when the rotatable member is properly mounted on the first axle stub.

2. The toy of claim 1 wherein said second regions of the first housing second and of the second housing section are hollow.

3. The toy of claim 1 wherein said second regions of the first housing second and of the second housing section are solid.

4. The toy of claim 1 wherein said second housing section comprises a snap latch projection as the means to engage a complementary snap latch receiving slot on the first housing section.

5. The toy of claim 1 wherein the second rotatable member further comprises a treat cavity.

6. The toy of claim 1 wherein said toy is made from plastic resin, rubber, or a synthetic material.

7. The toy of claim 1 wherein said housing further comprises indentations to allow for a pet to grip the toy in its teeth.

8. The toy of claim 1 wherein said housing further comprises grooves or ridges to allow for a pet to grip the toy with its paws.

9. The toy of claim 1 wherein said rotatable member further comprises bumps to allow a pet to facilitate rotation of the rotatable member with its paws.

10. The toy of claim 1 wherein said first housing section further comprises an aperture adjacent to said second region and a means for reversibly sealing said aperture.

\* \* \* \* \*